US00RE36296E

United States Patent [19]

Zeigler

[11] E Patent Number: Re. 36,296

[45] Reissued Date of Patent: Sep. 14, 1999

[54] PROPELLANT COMPOSITION FOR AUTOMOTIVE SAFETY APPLICATIONS

[75] Inventor: Edward Hays Zeigler, Radford, Va.

[73] Assignee: Alliant Techsystems, Inc., Hopkins, Minn.

[21] Appl. No.: 08/761,979

[22] Filed: Dec. 11, 1996

Related U.S. Patent Documents

Reissue of:

[64] Patent No.: 5,507,891
Issued: Apr. 16, 1996
Appl. No.: 08/514,189
Filed: Aug. 11, 1995

[51] Int. Cl.[6] ..... C06B 31/32

[52] U.S. Cl. ..... 149/47; 149/19.7; 149/19.9; 149/19.91; 149/19.6; 149/88; 149/93; 280/741

[58] Field of Search ..... 149/47, 19.7, 19.9, 149/19.91, 19.6, 88, 93; 280/741, 737, 738, 739, 740; 102/288, 289

[56] References Cited

U.S. PATENT DOCUMENTS

| | | | |
|---|---|---|---|
| 3,954,528 | 5/1976 | Chang et al. | 149/19.4 |
| 4,014,719 | 3/1977 | Wells | 149/19.7 |
| 4,014,720 | 3/1977 | Wells | 149/19.8 |
| 4,092,188 | 5/1978 | Cohen et al. | 149/19.4 |
| 4,555,277 | 11/1985 | Scribner | 149/19.4 |
| 4,689,097 | 8/1987 | Jones | 149/21 |
| 4,915,755 | 4/1990 | Kim | 149/19.4 |
| 4,981,534 | 1/1991 | Scheffe | 149/19.91 |
| 4,985,094 | 1/1991 | Nahlovsky et al. | 149/19.92 |
| 5,060,974 | 10/1991 | Hamilton et al. | 280/736 |
| 5,061,330 | 10/1991 | Reed et al. | 149/19.6 |
| 5,078,422 | 1/1992 | Hamilton et al. | 280/736 |
| 5,125,684 | 6/1992 | Cartwright | 280/736 |
| 5,230,532 | 7/1993 | Blumenthal et al. | 280/741 |
| 5,316,600 | 5/1994 | Chan et al. | 149/19.4 |
| 5,403,035 | 4/1995 | Hamilton | 280/102 |
| 5,441,302 | 8/1995 | Johnson et al. | 280/736 |
| 5,485,790 | 1/1996 | Hamilton | 102/280 |
| 5,542,704 | 8/1996 | Hamilton et al. | 280/741 |
| 5,553,889 | 9/1996 | Hamilton et al. | 280/736 |
| 5,602,361 | 2/1997 | Hamilton et al. | 102/288 |

FOREIGN PATENT DOCUMENTS

| | | |
|---|---|---|
| 420 726 | 4/1991 | European Pat. Off. . |
| 0591119 | 4/1994 | European Pat. Off. . |
| 673 809 | 9/1995 | European Pat. Off. . |

*Primary Examiner*—Peter A. Nelson
*Attorney, Agent, or Firm*—Vidas, Arrett & Steinkraus

[57] ABSTRACT

Clean burning, non-self extinguishing propellant compositions for use in hybrid automotive air bag systems are disclosed. The propellant compositions are based on a mixture of a crystalline nitramine propellant, an energetic or non-energetic binder and one or a combination of an oxidizing propellant and an energetic plasticizer.

19 Claims, No Drawings

PROPELLANT COMPOSITION FOR AUTOMOTIVE SAFETY APPLICATIONS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to inflator propellant compositions adapted for use with compressed gas-based air bag automotive safety systems.

2. Description of Related Art

Current usage of propellants in automotive safety applications falls into at least two classes: those that serve as inflators for air bags (either driver, passengers or side impact) and those that serve to tighten (remove slack from) more conventional restraint systems such as lap/shoulder belts. This invention addresses inflator propellants. Current inflator propellants can be further divided into those for inflators;called pyrotechnic type inflators, where the propellant provides all of the inflation gas, and those for so-called hybrid inflators where the propellant heat energy and gas serves to supplement a pre-pressurized volume of inert gas contained in a pressure bottle so as to speed up the inflation process and reduce the volume and size of the pre-pressurized gas source. This invention further addresses hybrid inflator systems.

Current state-of-the-art propellants for pyrotechnic inflators, where all of the gas is provided by the propellant, typically consist of a tableted mixture of sodium azide and an oxidant such as iron oxide. The byproducts of such a reaction are free iron, sodium oxide and gaseous nitrogen. Regardless of the oxidant, solid residue comprises a substantial proportion of these combustion products which must be filtered out of the gas stream via an elaborate filtration system.

The current state-of-the-art propellant for hybrid inflator systems is comprised of a mixture of polyvinyl chloride, a suitable plasticizer, and potassium perchlorate as an oxidizer. Although this propellant is suitable in terms of heat output and burning rate, a major combustion product is very finely divided potassium chloride (KCl). The KCl, dispersed as an aerosol, upon exhausting from the gas bag, acts as an obscurant which may impede occupant egress from a vehicle and, if inhaled, can cause retentions in allergic individuals.

The gas used to inflate the gas bag in both pyrotechnic and hybrid inflators must meet stringent requirements regarding toxic components such as carbon monoxide (CO) and oxides of nitrogen ($NO_x$), as well as thermal stability. These requirements are a crucial factor mendating the propellant types used to generate the inflator gas. Clean burning, conventional smokeless propellants containing nitrocellulose and nitroglycerin are unacceptable for use in either type because of the significant amounts of CO in their product gases when used in pyrotechnic inflators and their poor thermal stability when used in either system.

One type of hybrid inflator utilizes a pre-pressurized mixture of gaseous oxygen (up to 20%) and Argon. Because of the presence of oxygen, this type of hybrid inflator is capable of oxidizing carbon monoxide and hydrogen generated as combustion products in conventional propellants to the more desirable carbon dioxide and water, thus making possible the use of more conventional propellants which are not fully oxygen balanced. Poorly oxygen balanced propellants of the type commonly known as LOVA, based primarily on the energetic ingredient cyclo trimethylene trinitramine (RDX), have been tested and, although they possess the necessary thermal stability, their burning characteristics, i.e., low burning rate and tendency to self-extinguish, make them unsuitable.

The prior art discloses various other propellant compositions for use in automotive safety applications. For example, U.S. Pat. No. 5,125,684 discloses a stable, extrudable, non-azide crash bag propellant composition and a low temperature process for producing the same from an extrudable mass containing an effective amount of a cellulose based binder. The composition comprises 45–80 wt. % oxidizer salt, a cellulose based binder and 10–35 wt. % of an energetic component selected from a group which includes cyclotrimethylenetrinitramine (RDX) and cyclotetramethylenetetranitramine (HMX).

EP 591119 A2 discloses a gas emitting substance for inflating an accident safety airbag, comprising one or more high energy explosive(s) including 50 . 95% of (RDX) and/or (HMX) of a mean particle size of 1–20 microns, up to 5 wt. % of nitrocellulose; and 5–50 wt. % of a combustible, energetic or non-energetic binder, preferably one or more of polyurethane, cellulose acetate butyrate, hydroxy terminated polybutadiene, ethyl cellulose, glycidyl acid polymers and polymers of either 3-nitratemethyl-3-methyl oxymethane or glycidyl nitrate.

Other prior art patents disclose explosive or rocket propellant compositions which are not specifically designed as safety air bag propellants. For example, U.S. Pat. No. 3,954,528 discloses solid gas generating and gun propellant compositions employing triamino-guanidine nitrate as a propellant ingredient in admixture with an oxidant and a compatible synthetic polymer binder material. The oxidant may be selected from cyclotrimethylenetrinitramine (RDX) and cyclotetramethylenetetranitramine (HMX).

U.S. Pat. No. 4,689,097 discloses that a mixture of a nitramine and triaminoguanidium nitrate accelerates the burn rate for certain low smoke propellants. The nitramine may be selected from cyclotrimethylenetrinitramine (RDX) and cyclotetramethylenetetranitramine (HMX) or mixtures thereof. Fine triaminoguanidium nitrate particles and coarse nitramine particles are shown to be used in crosslinked propellant compositions.

U.S. Pat. No. 5,061,330 discloses a cast cured propellant and explosive made from a mixture of a polyglycidal azide polymer, an energetic plasticizer such as trimethylolethane trinitrate (TMETN) and HMX or RDX. The composition may also contain aluminum powder.

In addition, U.S. Pat. No. 5,316,600 discloses a castable, energetic, plastic-bonded explosive containing glycidyl azide polymer (GAP) combined with the energetic plasticizers trimethyloethane trinitrate (TMETN) and triethylene glycol dinitrate (TEGDN) or bisdinitropropyl formal and acetal mixture (BDNPF/A), and the explosive solid cyclotetramethylene tetranitramine (HMX) or cyclotrimethylene trinitramine (RDX).

However, none of these latter references discloses propellants compositions which are stable enough to function satisfactorily in hybrid inflator systems in such a way that the burning rates are increased and their tendency to self-extinguish is reduced.

SUMMARY OF THE INVENTION

The present invention provides for a crash bag propellant system comprising a source of compressed [oxygen-containing inert gas] *inert gas/oxygen mixture* and a propellant composition in functional proximity to ignition means for effecting ignition of said propellant within said gas, said propellant composition comprising a uniform mixture of: (a) from about 40 to about 80% by weight of a crystalline particulate propellant selected from the group consisting of cyclotrimethylenetrinitramine, cyclotetramethylenetetranitramine and mixtures thereof; (b) from 0 up to about 35% by weight of a crystalline particulate oxidant selected from the group consisting of ammonium nitrate, triaminoquanidinium nitrate, pentaerythritol tetranitrate and mixtures thereof; (c) from about 8 to about 30% by weight of an inert or energetic binder; (d) from 0 to about 15% by weight of an energetic plasticizer selected from the group consisting of trimethylolethane trinitrate, 1,5-diazido-3-nitraza pentane, tri(ethylene glycol)dinitrate, butane triol trinitrate, bis-dinitropropyl acetyl, bis-dinitropropyl formal, glycidal azide, 1,5-diazido-3-nitraza pentane, and mixtures thereof; provided, however, that where said binder component (c) does not comprise an energetic binder, the mixture contains at least about 5% by weight of component (b) or component (d) or a mixture of components (b) and (d).

Propellants of the invention possess the high thermal stability required for auto safety applications, high burning rates and fast ignition reaction times which render them suitable as smokeless propellants for use in hybrid inflator systems for automotive safety air bag applications.

DETAILED DESCRIPTION OF THE INVENTION

The propellant which is the energy constituent in the propellant system of the invention is a crystalline, particulate nitramine selected from cyclotrimethylenetrinitramine (RDX), cyclotetramethylene-tetranitramine (HMX) and mixtures thereof. A minor portion of the RDX or HMX propellant may be replaced by an auxiliary oxidizer propellant to impart improved oxygen balance to the system. Suitable oxidizer propellants include crystalline ammonium nitrate (AN), triaminoguanidinium nitrate (TAGN), pentaerythitrol tetranitrate (PETN) and mixtures thereof.

Where the propellant consists essentially of HMX or RDX, it is present in the composition at a preferred level of from about 70 to 80% by weight. Where the propellant comprises a mixture of HMX or RDX with AN, TAGN, or PETN, the HMX or RDX component is present at a level of at least about 40% by weight and the auxiliary oxidizer may be present at a level of from about 5 to 35% by weight. Where AN is the auxiliary oxidizer propellant it is present at a level of from about 5 to 15% by weight. Other auxiliary oxidizer propellants such as TAGN are present at preferred levels of from about 20 to 35% by weight.

These propellants or mixtures thereof should be present in the composition in the form of relatively finely ground particles having a median particle size of from about 2 to 30 microns, more preferably from about 3 to 15 microns, and are uniformly dispersed in an energetic or non-energetic binder as described hereafter.

Polymers which may be used as a binder for the composition of the invention include non-energetic (non-energetically combustible) binders or energetic (energetically combustible) binders. Suitable non-energetic binders include cellulose acetate, cellulose acetate butyrate, ethyl cellulose as well as elastomeric binders such as polyurethanes, polysilicones, gum rubbers of polybutadiene or polyisoprene, butyl rubbers and polybutadienes containing hydroxy or carboxy functionality. The most preferred non-energetic binder for use in the present invention is cellulose acetate because of its good oxygen combustion balance.

Energetic binders which may be used include glycidal azide polymer (GAP), glycidal nitrate polymers, 3-nitratomethyl-3-methyl oxetane polymers and mixtures thereof. These materials are normally liquid materials and need to be formulated with an appropriate amount of suitable curative to crosslink the material, e.g., from about 10–15% by weight based on the weight of binder of a multifunctional isocyanate such as hexamethylene diisocyanate and/or 4,4'-diisocyanatodicyclohexyl-methane.

Binders are present in the composition at a level of from about 8 to about 30% by weight, more preferably from about 10 to 15% by weight.

Where the binder used to formulate the compositions of this invention is non-energetic, the composition also preferably includes an energetic plasticizer. Suitable energetic plasticizers include liquids such as glycidal azide (GAP), trimethylolethane trinitrate (TMETN), tri(ethylene glycol) dinitrate (TEGDN), butane triol trinitrate (BTTN), bis-dinitropropyl acetyl (BDNPA), bis-dinitropropyl formal (BDNPF), 1,5-diazido-3-nitrazapentane (DIANP) and mixtures thereof.

Composition, especially those which contain nitrate esters as the energetic liquid plasticizer, also preferably contain suitable stabilizers as are known in the prior art. Stabilizers which may be used include amines such as diphenylamine, 2-nitrodiphenylamine and N-methyl-p-nitroaniline; urethanes such as 1,3-bis(N-methyl-phenyl urethane) benzene; phenols such as resorcinol; ureas such as diethyl diphenyl urea; and mixtures thereof. The stabilizer is normally used at a level of from about 3 to 15% by weight, based on the weight of the nitrate ester component present in the composition.

Where the composition contains one or more energetic plasticizers, these are generally present in the composition at levels of from about 5 to about 15% by weight.

The propellant compositions of this invention are specifically adapted for use in hybrid inflator systems where inflation takes place as the result of a triggered release of pressurized gas supplemented by an almost simultaneous firing of the propellant charge. The use of this combination of gas and heat sources allows for smaller pressurized gas containers than would be required if pressurized gas were the sole source of the inflation gas.

The pressurized gas is preferably an inert gas, e.g. argon, mixed with sufficient air or oxygen (generally up to about 20 volume percent) to provide sufficient oxygen for the oxidation of propellant combustion products such as carbon monoxide and hydrogen to non-toxic and non-flammable carbon dioxide and water. Pressures within the gas bottle may range from about 2,000 to about 5,000 psi, more preferably about 4,000 psi.

The propellant charge of the invention is positioned within the gas bottle, for example, in a canister, in functional proximity to an ignition means for effecting ignition of the propellant within the volume of pressurized gas.

Generally speaking, from about 2 to about 10 grams of propellant composition are used per 100 grams of compressed gas.

Actuation of these types of propellant systems generally takes place as the result of an electrical squib initiated by a crash sensor after automobile impact has been detected by the sensor. A biased piston is then actuated which penetrates a sealing diaphragm in the pressurized gas bottle, starting the release of pressurized gas which is operatively connected by gas flow lines to a folded air bag. Almost simultaneously, the piston contacts a firing pin in the propellant canister which impacts percussion primers, which in turn fires off an ignition charge, which in turn ignites the propellant charge. The combination of a relatively low volume of pressurized gas and the heat and gas generated by the burning propellant supplement one another to provide high pressures in the gas bottle sufficient to inflate the associated air bag quickly and efficiently.

Particularly preferred propellant composition for use in the present invention comprise mixtures of from about 70–80% by weight of RDX having a mean particle size of about 4–6 microns with from about 10–15% by weight of cellulose acetate binder and from about 10–15% by weight of an energetic plasticizer such as TMETN or GAP. Other preferred compositions comprise a mixture of from about 40 to 55% by weight of 4–6 micron size RDX, about 20 to 35% by weight of TAGN, about 10–15% by weight cellulose acetate binder and from about 10 to 15% by weight of TMETN or GAP. These combinations provide a particularly effective propellant when used in conjunction with a hybrid inflator system where the pressurized gas is a mixture of argon and from about 5–15 volume % of oxygen, providing a clean burning release gas very low in content of noxious gases such as carbon monoxide and nitrogen oxides.

The propellant composition may be prepared by mixing the components in a suitable mixing device such as a horizontal sigma blade mixer to form a dough. Dough formation is facilitated by inclusion of from about 15 to 35% by weight, based on the weight of the mixture, of a suitable processing solvent which is later removed after the dough has been pelletized. Suitable solvents include lower alkyl acetates, lower alcohols, ketones and mixtures thereof. Mixing is conducted at temperatures of from about 90°–130° F. for a period of time sufficient to form a very uniform dispersion of the solid particles within the dough, generally from about 30 to 120 minutes. The dough is then passed through an extrusion die to form strands which are cut to form pellets. The resulting pellets are subsequently dried to remove residual processing solvent.

The following examples are illustrative of the invention.

EXAMPLE 1

A propellant having the following composition was prepared:

| Ingredient | Percent (Wt.) |
|---|---|
| RDX (5 micron) | 76 |
| Cellulose Acetate | 12 |
| GAP | 12 |
| Total | 100.0 |

The propellant ingredients, totalling 12 pounds in weight, were added to a horizontal sigma blade mixer along with 4.5 pounds of a processing solvent consisting of equal parts ethyl acetate, ethyl alcohol, and acetone and then mixed for 90 minutes at 120° F. The resulting dough was cooled, removed from the mixer and extruded in a conventional 4 inch extrusion press through an extrusion die having an inside diameter of 0.147 inch and a central perforation-forming pin 0.053 inch in diameter. The resulting strands were cut in a cutting machine to a length of 0.44 inch. The resulting granules were then dried to remove processing solvent in a forced air dryer.

After drying, the granules had dimensions of length 0.431 inch, outside diameter 0.140 inch and the inside diameter 0.047 inch. No detectable amounts of processing solvent remained. When tested in a closed vessel, the propellant exhibited a linear burning rate of about 0.4 inches/second at 3000 psi.

EXAMPLE 2

A propellant having the following composition was prepared as in Example 1:

| Ingredient | Percent (WT) |
|---|---|
| RDX (5 micron) | 75 |
| Cellulose Acetate | 12.5 |
| TMETN | 11.25 |
| diethyl diphenyl urea | 1.25 |
| Total | 100.0 |

When tested in a closed vessel, the propellant exhibited a linear burning rate of about 0.37 inches/second at 3000 psi.

EXAMPLE 3

A propellant having the following composition was prepared as in Example 1:

| Ingredient | Percent (WT) |
|---|---|
| RDX (5 micron) | 47.0 |
| TAGN | 27.4 |
| Cellulose Acetate | 12.5 |
| GAP | 12.5 |
| diethyl diphenyl urea | 0.3 |
| resorcinol | 0.3 |
| Total | 100.0 |

The propellants of Examples 1–3 were tested by ignition of the pellets in a pressurized atmosphere of argon and oxygen and found to possess excellent burning qualities without self extinguishment. The quantity of carbon monoxide and ($NO_x$) gases generated was well below safety maximums, particularly with respect to the formulation of Example 2.

What is claimed is:

1. [A] *In a* crash bag propellant system comprising a source of compressed[, oxygen-containing inert gas] *inert gas/oxygen mixture* and a propellant composition in functional proximity to ignition means for effecting ignition of said propellant within said gas, *the improvement wherein* said propellant *is a* composition consisting essentially of a uniform mixture of:

a) from about 40 to about 80% by weight of a crystalline particulate propellant selected from the group consisting of cyclotrimethylenetrinitramine, cyclotetramethylenetetranitramine and mixtures thereof;

b) from 0 up to about 35% by weight of a crystalline particulate oxidant selected from the group consisting of ammonium nitrate, triamino-guanidinium nitrate, pentaerythritol tetranitrate and mixtures thereof;

c) from about 8 to about 30% by weight of an inert or energetic binder;

d) from 0 to about 15% by weight of an energetic plasticizer selected from the group consisting of trimethylolethane trinitrate, tri(ethylene glycol)dinitrate, butane triol trinitrate, bis-dinitropropyl acetyl, bis-dinitropropyl formal, glycidal azide, 1,5-diazido-3-nitraza pentane, and mixtures thereof;

provided however, that where said binder component (c) does not comprise an energetic binder, the mixture contains at least about 5% by weight of component (b) or component (d) or a mixture of components (b) and (d).

2. The system of claim 1 wherein said binder component (c) is an inert binder selected from the group consisting of cellulose acetate, cellulose acetate butyrate, ethyl cellulose, an elastomeric polymer and mixtures thereof.

3. The system of claim 2 wherein said propellant composition contains from about 5 to 15% by weight of component (d).

4. The system of claim 3 wherein component (d) is trimethylolethane trinitrate.

5. The system of claim 3 wherein component (d) is glycidal azide.

6. The system of claim 2 wherein said propellant composition contains from about 70 to 80% by weight of component (a).

7. The system of claim 2 wherein said propellant composition contains from about 5 to about 35% by weight of component (b).

8. The system of claim 7 wherein component (b) is ammonium nitrate present at a level of from about 5 to about 15% by weight.

9. The system of claim 7 wherein component (b) is triaminoguanidinium nitrate present at a level of from about 20 to about 35% by weight.

10. The system of claim 2 wherein said binder is cellulose acetate.

11. The system of claim 1 wherein said binder component (c) comprises an energetic binder selected from the group consisting of [cured glycidyl azide polymer], cured glycidyl nitrate polymers, cured 3-nitrato-methyl-3-methyl oxetane polymers, and mixtures thereof.

[12. The system of claim 11 wherein said energetic binder comprises a glycidyl azide polymer.]

13. The system of claim 1 wherein said propellant composition contains from about 70 to 80% by weight of component (a).

14. The system of claim 1 wherein said propellant contains from about 40 to about 55% by weight of component (a) and from about 20 to about 35% by weight of component (b).

15. The system of claim 14 wherein component (b) is triaminoguanidinium nitrate.

16. The system of claim 1 wherein said compressed gas is argon containing up to about 20% by volume of oxygen.

17. The system of claim 16 wherein said gas is maintained under a pressure of from about 2000 to about 5,000 psi.

18. The system of claim 1 comprising a mixture of from about 70 to 80% by weight of cyclotrimethylenetrinitramine, from about 10 to 15% by weight of cellulose acetate binder and from about 10 to 15% by weight of a plasticizer selected from the group consisting of glycidal azide and trimethylolethane trinitate.

19. The system of claim 17 wherein said plasticizer is trimethylolethane trinitrate.

20. The system of claim 1 wherein said propellant component (a) is cyclotrimethylenetrinitramine.

* * * * *